United States Patent Office 2,993,057
Patented July 18, 1961

2,993,057
MULTIOLEFIN-VINYL AROMATIC COPOLYMERS
Anthony H. Gleason, Westfield, N.J., assignor to Esso Research and Engineering Company, a corporation of Delaware
No Drawing. Filed Mar. 19, 1957, Ser. No. 646,974
6 Claims. (Cl. 260—346.6)

The present invention relates to copolymers prepared from multiolefins and vinyl aromatic compounds which have a hydrocarbon group attached to the alpha position of the vinyl group.

While many attempts have been made to prepare a copolymer of a multiolefin and an alpha alkyl vinyl aromatic compound, all of these endeavors resulted in methods which are not commercially feasible because they require an undesirably long induction period. It has now been discovered that copolymers of this type may be readily formed by carrying out the polymerization in the presence of certain ether promoters, namely tetrahydrofuran or tetrahydropyran, at a temperature not higher than about 35° C. Furthermore it has been found that these copolymers may be modified with oxygen and oxygen-containing compounds to produce highly useful substances.

According to the present invention, a $C_4$ to $C_6$ multiolefin, such as butadiene, isoprene, dimethyl butadiene, etc. is copolymerized with an alpha alkyl vinyl aromatic compound, such as alpha methyl styrene (alpha methyl vinyl benzene), alpha ethyl styrene (alpha ethyl vinyl benzene), etc. in the presence of an ether which may be either tetrahydrofuran or tetrahydropyran and an alkali metal catalyst at a temperature between about 0 and 35° C. for from a few hours up to 24 hours. By this method one may obtain conversions as high as 90 to 100%, whereas other methods will result in much lower conversions, e.g. 10%, for the same length of time.

The temperature is a critical factor in the polymerization and if allowed to rise above 35° C. the yield will be greatly reduced. Therefore, for optimum quality as well as yield, the temperature should be maintained between about 25 and 30° C.

An important feature of this invention is the use of certain ether promoters, namely tetrahydrofuran and tetrahydropyran. While they may be used in amounts varying from 10 up to about 100 parts by weight per 100 parts by weight of monomer, it is preferred to use between about 20 to 30 parts per 100 parts of monomer.

The monomer feed should comprise between about 70 to 95 parts of a $C_4$ to $C_6$ conjugated multiolefin and 5 to 30 parts of an alpha lower alkyl vinyl aromatic compound, preferably one having 1 to 2 carbon atoms in the alkyl group. For most purposes a satisfactory feed consists of 75 to 85 parts of multiolefin and 15 to 25 parts of the substituted monomer. However, it should be noted that the monomers may be added separately, together, or at different times. For instance, the reactor may be started on a multiolefin feed and later converted to a feed comprising a mixture of the two monomers.

The alkali metal catalyst should be in a finely divided state, e.g. about 10 to 50 microns, the preferred metal being sodium. While it has been found that as little as 0.1 part and as much as 10 parts by weight per 100 parts of monomer may be successfully used, it is best to use about 1 to 3 parts of catalyst for each 100 parts of monomer.

Often it is also advantageous to use about 1 to 50 weight percent, preferably 10 to 20 weight percent based on the alkali metal or about 0.1 to 1 weight percent based on monomers, of a $C_2$ to $C_{10}$ aliphatic alcohol, such as isopropanol, secondary butanol, tertiary butanol, n-propanol or n-pentanol. Such alcohols have been found to act as catalyst promoters. The coarser the catalyst dispersion, the more essential it is to have a sufficient amount of alcohol promoter present.

The catalyst is usually fed to the reactor as a slurry of alkali metal particles dispersed in 2 to 200 parts of a hydrocarbon solvent. For example, in large-scale operations it is possible to operate with catalyst slurries containing one part of sodium dispersed in 3 to 5 parts of hydrocarbon liquid, whereas in bench-scale runs it is more practical to use catalyst slurries containing one part of sodium dispersed in 50 to 100 parts of carrier liquid. Agitation of the reaction mixture during synthesis increases the efficiency of the catalyst.

Destruction of catalyst at the end of the reaction can be effectively accomplished, for example, by treating the crude product with clay or a slight excess of an acid such as glacial acetic acid or sulfuric acid. In the latter case the mixture is neutralized with ammonia, and the neutralized product is finally filtered with a filter aid such as silica gel, clay, charcoal or its equivalent.

To facilitate the polymerization, it is advisable to have an inert volatilizable hydrocarbon diluent boiling between, say, about 0 and 300° C. present. It is preferred to use saturated hydrocarbons, such as decane, decalin, cyclohexane, which boil between about 50 and 250° C., in an amount between 200 and 500 parts per 100 parts of monomer.

The resulting product may have a viscosity at 25° C. between about 0.1 and 2 poises at 50% NVM (non-volatile matter) in a paraffinic hydrocarbon diluent boiling between about 150 and 200° C. having a density of about 0.79. The copolymer will generally contain between 5 to 30 weight percent of the alpha lower alkyl vinyl aromatic compound and between 70 and 95 weight percent of multiolefin and have a Wijs iodine value between about 275 and 350.

If desired, the copolymer may be modified in several ways. According to one embodiment, the copolymer oil is oxidized with an oxygen-containing gas, such as air or oxygen, preferably in the presence of an inert hydrocarbon solvent. For instance, a copolymer oil, consisting of, say, 80 weight percent butadiene and 20 weight percent alpha methyl styrene, may be charged into a vertical tank having near the bottom thereof a porous thimble or distributing plate. An oxygen-containing gas may be bubbled through the oil solution, at a moderate rate for about 1 to 2 hours at a temperature between about 20 and 150° C., preferably between 100 and 130° C. A copolymer oil containing from about 0.05 to 20 weight percent combined oxygen is recovered. Thus the copolymer oil is the major component and the combined oxygen is the minor component.

The nature of the oxidized copolymer depends largely upon the extent to which the oxidation is carried. The degree of oxidation in turn depends on various factors including time of oxidation, temperature, presence or absence of catalysts, type of solvent, etc. In general, the greater the degree of oxidation, the more insoluble is the oxidized copolymer in paraffin hydrocarbon solvents. If desired, the oxidation may be carried out so that the product is soluble in paraffinic hydrocarbons indicating that the oxidation has proceeded to a relatively slight extent. On the other hand, the oxidation can be carried out so that the product is insoluble in paraffinic solvents, but is soluble in aromatic solvents indicating that the oxidation has proceeded to a high degree.

In another embodiment the copolymer oil is combined with between about 0.01 and 2.5 weight percent of an anhydride of an unsaturated dicarboxylic acid by heating the oil and anhydride to a temperature between 150 and 250° C. for several hours. Suitable anhydrides include maleic, chloro-maleic or citraconic anhydrides. These copolymer oils are particularly useful as protective coatings. They may be brushed or sprayed onto the surface of the article to be protected and then either air dried or baked. If desired a cobalt or manganese naphthenate may be used to accelerate drying.

The following examples are given to provide a better understanding of the invention.

*Example 1*

A number of experiments were carried out to illustrate the advantage of employing tetrahydrofuran or tetrahydropyran to promote the polymerization. In each run 80 parts by weight of butadiene-1,3 were contacted with 20 parts by weight of alpha methyl styrene in the presence of 2 parts by weight of finely divided sodium (ca. 50 microns), 300 parts by weight of an inert saturated hydrocarbon diluent boiling between 175 and 200° C., 0.3 part by weight of isopropanol and 30 parts by weight of various ether promoters. The reaction mixtures were maintained at a temperature between 25 and 30° C. throughout the polymerization. The viscosity measurements were made in the presence of the reaction diluent.

| Ether Promoter | Percent Conversion After [1]— | | | Viscosity at 50% NVM, Poise |
|---|---|---|---|---|
| | 18 Hrs. | 40 Hrs. | 65 Hrs. | |
| Dioxane | 11 | 84 | 92 | |
| Ethyl Ether | 11 | | | |
| Tetrahydrofuran | 100 | | | 0.8 |
| Tetrahydropyran | 90 | | | 0.3 |

[1] Based on the monomers.

These data show the striking difference in conversion brought about by using tetrahydrofuran or tetrahydropyran to shorten the induction period and promote the polymerization. On the other hand, dioxane and ethyl ether were much less effective, producing only an 11% conversion after 18 hours. The importance of the reaction temperature is illustrated by the fact that in no case could 100% conversion be obtained at 50° C. even after reacting for 65 hours.

*Example 2*

In another experiment, 100 parts by weight of a copolymer oil, which was prepared in the presence of tetrahydrofuran and which contained 20 weight percent alpha methyl styrene and 80 weight percent of butadiene, was dissolved in a hydrocarbon solvent boiling between 160 and 182° C., having a 31.1 API gravity (15.6° C.), a kauri-butanol value of 91 and containing 96 weight percent aromatic compounds. A small amount (0.01 part) of manganese as naphthenate was added to the copolymer solution and the resulting mixture was treated with oxygen for 5 hours at 105° C. while being agitated with a mixer rotating at 4000 r.p.m. The modified copolymer oil contained 9.4 weight percent oxygen and had a viscosity of 1.25 poises at 50% NVM and 25° C.

Resort may be had to various modifications of the present invention without departing from the spirit thereof or the scope of the appended claims.

What is claimed is:

1. A method for preparing a copolymer which comprises polymerizing a conjugated diolefin having between 4 and 6 carbon atoms with an alpha lower alkyl styrene chosen from the group consisting of alpha methyl styrene and alpha ethyl styrene in the presence of an alkali metal catalyst and an ether which is a member of the group consisting of tetrahydrofuran and tetrahydropyran, at a temperature between about 0 and 35° C.

2. A method according to claim 1 in which the temperature is between 25 and 30° C.

3. A method according to claim 1 in which there is the additional step of blowing the copolymer with an oxygen-containing gas selected from the group consisting of air and oxygen.

4. A method according to claim 1 in which the copolymer is subsequently heated with 0.01 to 2.5 weight percent of an unsaturated acid anhydride chosen from the group consisting of maleic, chloromaleic and citraconic at a temperature between 150° and 250° C.

5. Process according to claim 1 in which the styrene is alpha methyl styrene.

6. Process according to claim 1 in which the styrene is alpha ethyl styrene.

References Cited in the file of this patent

UNITED STATES PATENTS

| 1,938,731 | Tschunkur et al. | Dec. 12, 1933 |
| 2,652,342 | Gleason | Sept. 15, 1953 |
| 2,692,255 | Kreider | Oct. 19, 1954 |
| 2,732,412 | Gleason et al. | Jan. 24, 1956 |

FOREIGN PATENTS

| 339,135 | Great Britain | Dec. 4, 1930 |